Figure 1:
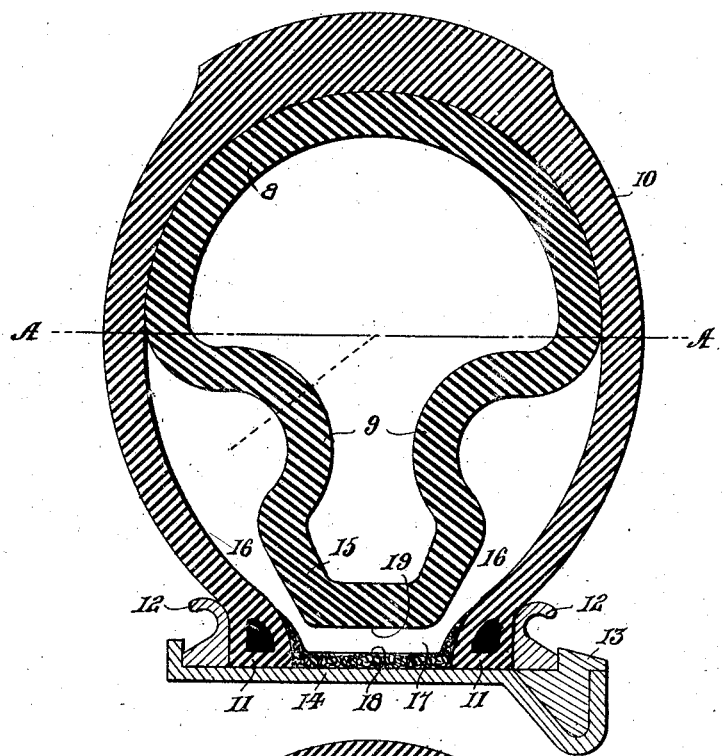

Feb. 24, 1925.  
B. G. GOBLE  
1,527,863  
INFLATABLE TIRE  
Filed March 17, 1921

Inventor  
B. G. Goble  
By J. W. Bryant  
Attorney

Patented Feb. 24, 1925.

1,527,863

UNITED STATES PATENT OFFICE.

BERT G. GOBLE, OF TULSA, OKLAHOMA.

INFLATABLE TIRE.

Application filed March 17, 1921. Serial No. 453,002.

*To all whom it may concern:*

Be it known that I, BERT G. GOBLE, a citizen of the United States of America, residing at Tulsa, in the county of Tulsa and State of Oklahoma, have invented certain new and useful Improvements in Inflatable Tires, of which the following is a specification.

This invention relates to certain new and useful improvements in inflatable tires, and more particularly relates to inner tubes of the "self-healing" or compression type, wherein the material of the tube is placed under compression instead of expansion when the tube is encased and inflated.

Heretofore, in inner tubes of the compression type, and wherein a continuous annular depression is provided in the tube, they have been provided with this depression in or sufficiently near the tread portion of the tube so that when the tube is inflated, the depressed portion of the tube is placed under circumferential expansion or stretch, even though compression of the tube is had transversely. Under many conditions of use, this is detrimental and avoidance of the stretching is highly desirable. It is accordingly an object of the present invention to provide a compression tube with continuous annular depressions located inwardly of the axial center line of the tube so that the depressed portions of the tube are placed under circumferential compression and the entire tube is placed under transverse compression when the tube is inflated within the casing.

Also, with the depressions situated as in the prior art, a quite rigid construction is provided which may not be readily flexed for easy placement of the tube within the casing.

It is accordingly a further object of the invention to provide the depressions at such location and of such curvature as to induce flexibility for permitting ready insertion of the tube within the casing.

Further, with the depressions situated as in the prior art, there is not only danger of pinching the tube when placing it under pressure, but the circumferential length of the inner portion of the ordinary compression tube is so nearly similar to the circumferential length of the rim with which it is used that the tube must be considerably stretched in order to get the tire onto the rim. It is accordingly a still further object of the invention to make the inner portion of the tube of greater normal circumferential length than the rim and normally spaced at the inner side portions from the bead portions of the tire casing so that the present tire may be not only more easily placed upon the rim, but the securing rings of the rim may be readily forced into position because inward yielding of the bead portions of the casing is thereby permitted.

With the above general objects in view and other that will become apparent as the nature of the invention is better understood, the same consists in the novel form, combination and arrangement of parts hereinafter more fully described in connection with the accompanying drawing and in which like reference characters indicate corresponding parts throughout the several views.

Figure 2:
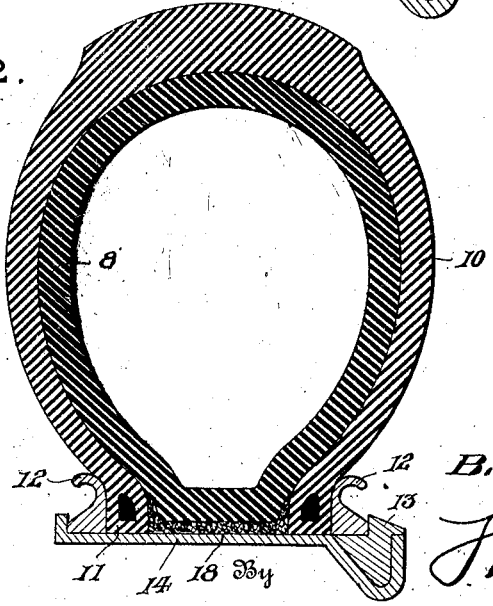

In the drawings,

Figure 1 is a transverse section through a tire showing the present inner tube seated therein and in its normal condition prior to the admission of air under pressure to the interior of the same, and Figure 2 is a transverse section similar to Figure 1 but drawn on a slightly smaller scale and with the tube inflated by air under pressure so as to place the tube under circumferential and transverse compression.

Referring more in detail to the drawing, the inner tube is denoted by the numeral 8 and is normally molded in the shape shown in Figure 1 with a continuous annular depression 9 at each side thereof entirely inwardly of the axial center line A—A and with the entire tread portion of the tube molded to substantially contact the similar portion of the inner face of the usual casing 10 throughout, the folds 9 being based upon any symmetrical curves so as to induce flexibility and so as to provide the tube with an external diameter greater than the internal diameter of the casing 10 whereby when the tube is inflated within said casing, said tube is placed under transverse compression throughout and under circumferential compression at the fold portions of the same. That the circumferential compression will be obtained, will be obviously seen when it is considered that the depressions move inwardly when the tube is inflated so that they are reduced in circumferential length. In this way all circumferential stretch of the tube is avoided so that there is no tendency to open punctures.

It will be understood that the walls of the tube are of substantially uniform thickness and of sufficient thickness to insure retention of the shape shown in Figure 1 under normal conditions. In order to permit inward yielding of the bead portions 11 of the casing 10 for permitting ready insertion of the fastening rings 12 and 13 carried by the rim 14, the inner portion 15 of the tube 8 is molded of a normal width so as to be spaced as at 16 from these bead portions of the casing, thus rendering an ordinarily difficult operation of applying and removing the rings 12 and 13 considerably easier. The placement of the tire upon the rim 14 is also made much easier by the provision of this spacing and the additional spacing as at 17 between the usual liner flap or band 18 on the rim 14 and the inner periphery 19 of the tube. In this way, the periphery 19 is made of a greater circumferential length than the circumferential length of the rim 14 or band 18 so that when the tube is placed under air pressure, the inner portion of the tube will simply move inwardly into contact with the bead portions of the casing and with the band 18 as shown in Figure 2, or if the band 18 is not employed, the periphery of the tube will contact the face of the rim 14. By providing this normal spacing as at 16 and 17, danger of pinching of the tube is incidentally also reduced to a minimum as this portion of the tube is the last to seek contact with the adjacent parts of the rim and casing.

As will be understood, the inner tube formation disclosed herein has a normal definite and predetermined cross-sectional configuration when out of the casing and free from pressure application, and a cross sectional configuration that is varied from this normal configuration when the formation is inflated within the shoe, the formation having its walls of a thickness such as to maintain such normal configuration when free from pressure application to the formation: these two configurations are shown respectively in Figs. 1 and 2, Fig. 1 showing what is termed the normal configuration in that this configuration is that produced when the formation is manufactured and is maintained constant as long as no application of pressure is applied thereto, the normal configuration thus being that present during the time when the formation is being marketed, the material of the walls being such as to retain this configuration while in the normal or inactive position of the formation. There may be a necessity for changing this configuration for the purpose of inserting the formation within the shoe, provided by the application of external pressure, but the formation is free from internal inflating pressure until the formation has been inserted within the shoe, whereupon this normal configuration is changed by the effects of the introduction of the air that is being used to inflate the tube, at which time the formation passes to the configuration shown in Fig. 2.

As shown in Fig. 1, this normal configuration has that portion lying without a line extending transversely through what may be considered as the axis of a cross-section of the formation, shaped complemental to the shape of the corresponding inner face of the shoe, although the radius or radii employed in producing this portion of the formation, may be of greater length than the radii or radius which would be employed in producing a curved line corresponding to the inner face of the shoe at this portion of the shoe—the difference in radius or radii length producing the conditions of a formation of greater diameter than that of the inner face of the shoe into which it is to be placed. As a result of this arrangement, it will be understood that when inflated, the shoe will act to shape this portion of the tube formation, with the result that there will be a compression effect produced on the material of this portion of the formation both circumferentially and transversely.

That portion of the formation inside of such line presents a cross-sectional contour that is dissimilar to that of the corresponding inner face of the shoe, the contour of this portion of the formation including an annular depression on each side of and symmetrically positioned with respect to a plane that extends intermediate the sides of the formation and through such formation axis. A cross-section of the wall of each of these depressions presents a curved portion with one end of such portion leading to and joining the outside portion of the formation in juxtaposition to said line and with its opposite end leading to and joining the wall of the inner zone of the formation at an approximate point spaced a material distance from the face of minimum diameter of the formation. As seen in Fig. 1, the wall of the formation at such joining points extends in a direction that is reversely curved to that of the portion of the wall that is within the depression itself, the depressions and the joining portions extending on curved lines free from abrupt changes in direction. Because of this latter fact, it will be readily understood that when the inflating pressure of the air begins to eliminate the depression by moving the bottom of the depression toward the shoe, the pressures resulting on the walls of the depressions will follow the contour of the joining portions rather than extend in directions that are angular thereto, the result being that there is produced a condition of material compensation, the material throughout the wall of the formation accommodating itself to the changes in conditions brought about by the reduction in the overall dimensions of the outer portion of the shoe formation and the change in the contour of the inner portion of the formation by the elimination of the depressions and the change in the inner zone portion of the formation. Due to the fact that the actual length of the periphery of a cross section of the formation is greater than that of the similar length of the internal face of the shoe and the rim support that is active in producing the cavity for the formation, the entire formation is acted upon in such manner as to place the material of the formation under compression throughout a cross-section of the formation; and since the changes in the cross-sectional configuration are such as to force the material to occupy a smaller space than in the normal configuration, it will be readily understood that the formation is also placed under compression circumferentially.

It will also be seen that the inner zone portion between the similar ends of the opposing depressions extends in directions such as to provide a contour of which an intermediate portion of considerable length is of equal diameter throughout such length, the depressions and inner zone portions combinedly producing a cross sectional space configuration of "neck" characteristic with an intermediate portion of the "neck" space of an increased width, the overall width of the enlarged "neck" portion, however, being materially less than the distance between the opposite faces of the positioned shoe at the corresponding point of the latter. This arrangement aids in permitting the material of the walls to compensate in presence of the inflating pressure, avoiding the presence of an abrupt bend in the cross-sectional contour at the place of juncture of the depression and the inner zone portion; the exterior at this point may appear as more or less angular instead of curved with a sweeping curve. This is due to the fact that the wall of the depression at this point extends in the general direction of the diverging wall of this inner zone portion, with the result that the pressure that is developed in the wall of the depression during its elimination, is directed toward and in the direction of cross-sectional length of the diverging wall, thus avoiding the effects of a pressure application at this point extending in directions that are transverse to the wall which continues the contour.

One of the greatest advantages of a non-stretch or compression tube is that compression or compacting of portions of the tube makes the latter wear much longer in view of the fact that the compression gives a greater density of material and insures return of the tube to its normal shape whereby reinsertion of the tube within the casing is at least as easy as the initial placement of the tube within the casing. Also, compression tubes may be made of coarser or less non-porous material than tubes which are placed under stretch or tension. On the other hand, with tubes which are placed under stretch or tension the rubber gradually gets old and loses its elastic qualities as it is subjected to continuous stretch, and it will not return entirely back to its original molded shape when deflated so that reinsertion of the same within the casing is often times quite hard.

From the foregoing description, it is believed that the construction and operation as well as the advantages of the present invention will be readily understood and appreciated by those skilled in the art.

Reservation is made of the right to make such specific changes in contour and arrangement as may fall within the spirit and scope of the invention as expressed in the accompanying claim.

What is claimed as new is:

As a means for pneumatically supporting a casing or shoe for vehicle service, an inner tube formation having a normal definite and predetermined cross-sectional configuration when out of the casing and free from pressure application and a cross-sectional configuration varied from such normal configuration when inflated within the shoe, said tube formation having its walls of a thickness such as to maintain such normal configuration when free from pressure application to the formation, the dimensions of such formation in its normal configuration being such as to present the major diameter of the formation as greater than the maximum diameter of the interior of the shoe to produce a circumferential length of the formation on its major diameter greater than the similar length of such shoe maximum internal diameter, a cross-section of the formation in normal configuration presenting that portion of the wall of the formation outside of a line extending transversely through the approximate axis of the formation as of generally complemental contour to that of the corresponding inner face of the shoe, that portion of the formation inside such line representing a contour dissimilar to that of the corresponding inner face of the shoe, said latter formation contour including an annular depression on each side of and symmetrically positioned with respect to a plane extending intermediate the sides of the formation and through such formation axis, a cross-section of the wall of each depression presenting a curved portion with one end leading to and joining such outside portion of the formation in juxtaposition to said line and its opposite end leading to and joining the wall of the inner zone of the formation at an approximate point spaced a material distance from the face of minimum diameter of the formation, the wall at such joining points extending in a direction reversely-curved to that portion of the wall within the depression, the depressions and the joining portions extending on curved lines free from abrupt changes in direction, whereby the formation is insertible within the shoe and the cross-sectional wall of the formation is inflatable to place it in contact with the positioned shoe, the wall contour being such that inflation of the formation within the shoe will place the material of the formation under compression both transversely and circumferentially.

In testimony whereof I affix my signature.

BERT G. GOBLE.